S. D. WILLS.
SPRING MOUNTED WHEEL.
APPLICATION FILED OCT. 18, 1913.
1,136,191.
Patented Apr. 20, 1915.
2 SHEETS—SHEET 1.
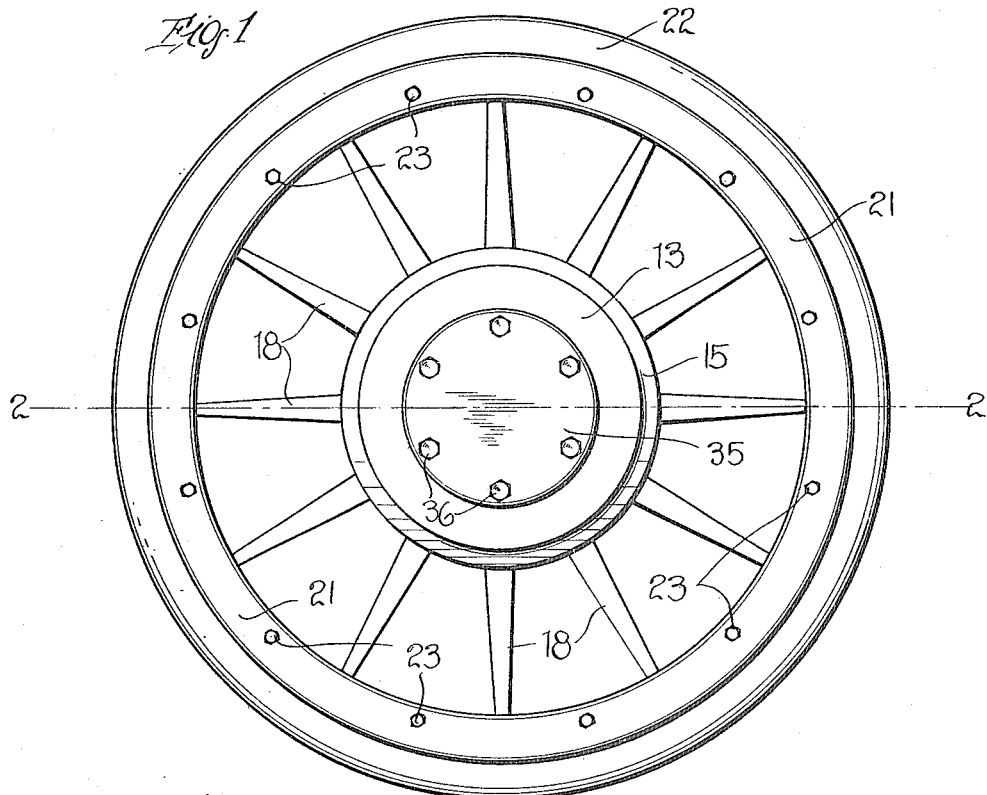
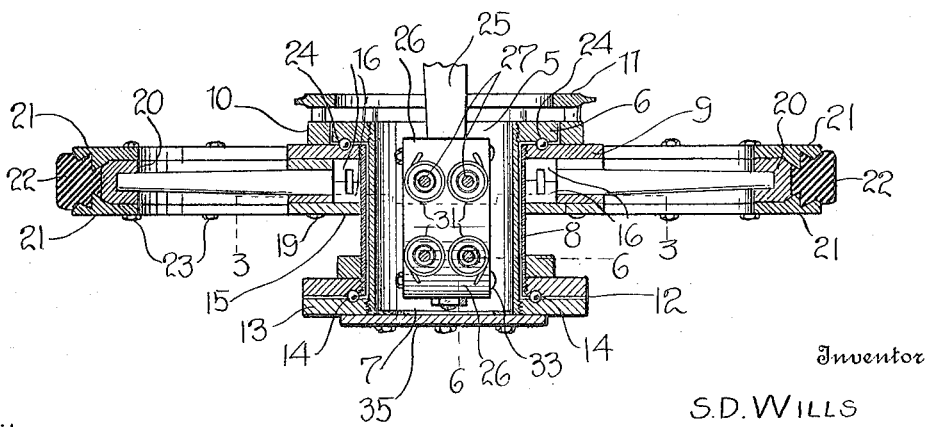
Witnesses
Robert M. Sutphen
V. J. Dowrick
Inventor
S. D. Wills
By Watson E. Coleman
Attorney

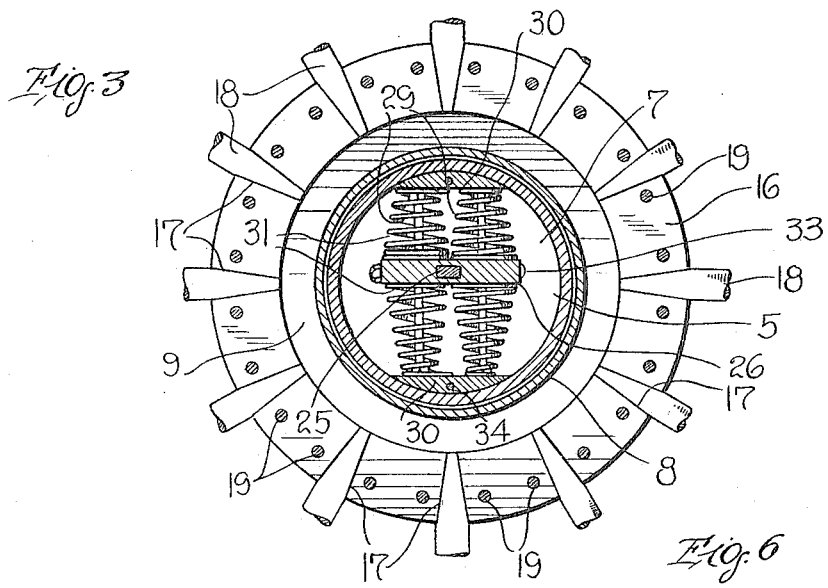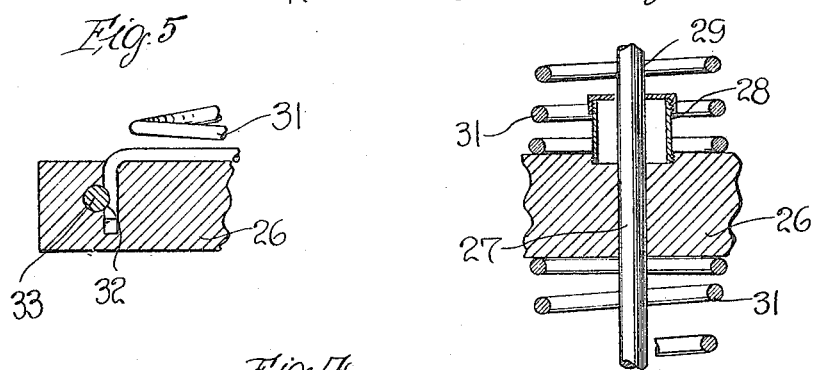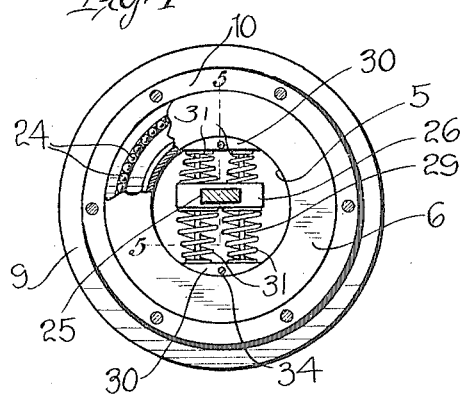

UNITED STATES PATENT OFFICE.

SILAS D. WILLS, OF FORT PAYNE, ALABAMA.

SPRING-MOUNTED WHEEL.

1,136,191. Specification of Letters Patent. Patented Apr. 20, 1915.

Application filed October 18, 1913. Serial No. 796,026.

*To all whom it may concern:*

Be it known that I, SILAS D. WILLS, a citizen of the United States, residing at Fort Payne, in the county of Dekalb and State of Alabama, have invented certain new and useful Improvements in Spring-Mounted Wheels, of which the following is a specification, reference being had to the accompanying drawings.

This invention relates to spring wheels and more particularly to wheels of that class generally known as "resilient hub wheels," the present invention having for its primary object to produce such a wheel wherein is embodied certain structural features resulting in a maximum of resiliency combined with extreme durability whereby the necessity of frequent repairs and the expense incident thereto is obviated.

The invention has for another of its objects to provide a spring wheel which will serve as an efficient and reliable substitute for the common pneumatic tire wheel now in general use.

My invention has for another and more specific object to provide a wheel hub of improved construction wherein friction and wear upon the several parts is reduced to a minimum.

The invention has for a further object to provide a wheel of the above character which consists of comparatively few parts all of simple construction whereby the wheel may be produced at comparatively small manufacturing cost.

With the above and other objects in view, this invention consists in the novel features of construction and the combination and arrangement of parts to be hereinafter more fully described, pointed out in the claim and shown in the accompanying drawings, in which—

Figure 1 is a side elevation of a wheel embodying the preferred form of my invention; Fig. 2 is a section taken on the line 2—2 of Fig. 1; Fig. 3 is a section taken on the line 3—3 of Fig. 2; Fig. 4 is an inner face view of the wheel partly in section; Fig. 5 is a detail section taken on the line 5—5 of Fig. 4; and Fig. 6 is a section taken on the line 6—6 of Fig. 2.

Referring in detail to the drawings, 5 designates the hollow stationary hub or sleeve which is provided upon one of its ends with an exterior annular flange 6 and upon its other or outer end with an inwardly projecting annular flange 7. The rotary thimble 8 is mounted upon the hub sleeve and upon one end of the same a collar 9 is bolted or otherwise rigidly secured. The outer face of this collar has a flange 10 formed thereon to which the sprocket wheel 11 is adapted to be secured whereby the wheel is driven from an engine or other source of power. Upon the opposite end of the thimble 8 a collar 12 is secured. A similar collar 13 is threaded upon the outer end of the hub sleeve 5. The opposed faces of the collars 12 and 13 are provided with annular raceways to receive the bearing balls 14. Upon the hub thimble 8 an annular plate 15 is loosely engaged and between this plate and the collar 9 on the end of the thimble a pair of spoke clamping rings 16 are disposed. These rings are provided in their opposed faces with tapering recesses 17 to receive the inner ends of the wheel spokes 18. Upon opposite sides of each wheel, clamping bolts 19 extend through the plate 15, rings 16 and the collar 9 whereby the spokes are securely clamped in connection with the hub thimble. The felly of the wheel to which the outer ends of the spokes 18 are secured consists of an annular body member 20 preferably of wood, and the rim plates 21 arranged upon the opposite faces of said body member and adapted to retain the solid rubber tire 22 upon the outer face of said member. It will, of course, be obvious that a metal tire may be substituted for the resilient rubber tire, if desired. Suitable bolts 23 extend through and connect the body member 20 and the side plates 21. It will also be noted from reference to Fig. 2 that annular raceways are provided in the opposed faces of the flanges 6 and 9 secured upon the corresponding ends of the hub and the rotary thimble respectively, in which the antifriction bearing balls 24 are arranged.

The vehicle axle designated by the numeral 25 may be of any desired form and extends into the hollow hub 5. This axle has suitably secured thereto a block 26 which is disposed within the wheel hub. The block is provided with spaced openings 27 and in the upper end of each opening a suitable oil cup 28 is arranged. Guide rods 29 extend through the openings 27 and adjacent the oil cups 28 and have their ends secured in the blocks 30 which in turn are fixed to the inner wall of the hub 5. Upon opposite sides of the block 26, a coil spring 31 is arranged upon each of the guide rods 29. These springs at one of their ends extend into openings provided in the block 26 and are notched, as shown at 32 to receive the rods 33 which extend transversely through said block and serve to securely lock the springs in connection therewith. The other or outer ends of the springs are similarly retained in connection with the blocks 30 by means of the bolts 34.

Over the outer end of the hub 5 a washer plate 35 is arranged, said plate being secured to the inwardly extending flange 7 of the hub by means of a plurality of bolts 36.

From the foregoing description taken in connection with the accompanying drawings, it will be seen that I have produced a spring wheel which is extremely strong and durable in its construction and admits of the use of a solid rubber or metallic tire wheel which provides a maximum of resiliency so that all shock or jar will be absorbed by the wheel and not transmitted to the body of the vehicle. My improved wheel is especially designed for use upon automobiles, and owing to the fact that all of the several parts are of simple form and not liable to get out of order, the wheel is also adapted for use upon heavy motor trucks, it being understood, of course, that the springs will be of the proper size and the other parts of the required proportions in accordance with the load to be sustained. The invention as a whole may be easily and quickly assembled upon the wheel axle or removed therefrom when necessary.

While I have above described the preferred form and construction of the several elements employed, it is obvious that the invention is susceptible of a great many modifications therein and I, therefore, reserve the right to resort to all such legitimate changes that may be fairly embodied in the spirit and scope of my invention as claimed.

What I claim is:—

The herein described spring mounted wheel including in combination, the following elements to wit, a hub sleeve having an outwardly projecting annular flange formed upon one end and an inwardly projecting annular flange formed upon its other end, an annulus detachably threaded upon the latter end of said sleeve, a thimble loosely mounted to rotate upon said sleeve and having an annular flange formed on each end, one of said flanges being of greater diameter than the exterior flange on the hub sleeve, a sprocket wheel rigidly mounted upon the latter flange of said thimble, means for securing the wheel proper upon the thimble, a plate bolted upon the inwardly extending flange of the hub sleeve and entirely closing the end of said sleeve, said plate projecting upon the outer face of the annulus which is threaded upon the sleeve, and means for yieldably mounting the wheel hub upon an axle and normally maintaining the same in concentric relation thereto.

In testimony whereof I hereunto affix my signature in the presence of two witnesses.

SILAS D. WILLS.

Witnesses:
J. B. HARALSON,
H. B. BROOK.

Copies of this patent may be obtained for five cents each, by addressing the "Commissioner of Patents, Washington, D. C."